United States Patent [19]

Warkentin

[11] Patent Number: 4,961,489
[45] Date of Patent: Oct. 9, 1990

[54] PRODUCT HANDLING SYSTEM

[75] Inventor: Aaron J. Warkentin, Orange Cove, Calif.

[73] Assignee: MAF Industries, Inc., Traver, Calif.

[21] Appl. No.: 515,313

[22] Filed: Jul. 18, 1983

[51] Int. Cl.$^5$ .............................................. B65G 43/00
[52] U.S. Cl. .................................... 198/365; 198/706; 198/802; 209/539; 209/698
[58] Field of Search ............... 209/552, 539, 698, 707, 209/648, 653, 650, 912, 918; 198/365, 706, 802, 851

[56] References Cited

U.S. PATENT DOCUMENTS

| | | | |
|---|---|---|---|
| 1,026,385 | 5/1912 | Dull | 198/706 |
| 3,017,024 | 1/1962 | Mumma | 198/365 |
| 3,112,822 | 12/1963 | Meyforth | 198/706 |
| 3,637,066 | 1/1972 | Idskov | 198/365 |
| 3,750,879 | 8/1973 | Luckett et al. | 198/365 |
| 3,842,968 | 10/1974 | Owens | 198/851 |
| 3,944,056 | 3/1976 | Feehery | 198/706 |
| 4,031,998 | 6/1977 | Suzuki et al. | 198/365 |
| 4,106,628 | 8/1978 | Warkentin et al. | 209/556 |
| 4,143,751 | 3/1979 | Foster et al. | 198/365 |
| 4,351,429 | 9/1982 | Garvey | 198/851 |

FOREIGN PATENT DOCUMENTS

| | | |
|---|---|---|
| 836518 | 6/1960 | United Kingdom . |
| 1335114 | 10/1973 | United Kingdom . |
| 2033866 | 5/1980 | United Kingdom . |
| 1597229 | 9/1981 | United Kingdom . |
| 2117341 | 10/1983 | United Kingdom . |

Primary Examiner—Donald T. Hajec

[57] ABSTRACT

A system for the processing and handling of products including the method and apparatus therefor. A conveyor includes rocker elements fixed thereto which may be selectively tipped by means of an actuator and camming surface to off-load products conveyed in a single file arrangement. The rocker elements are positioned on a chain to form an elongate support for the conveyed products. Two conveyors positioned side by side for receiving product in series may be used to provide a full view of the surface of the product for sensing by multiple sensors.

24 Claims, 3 Drawing Sheets

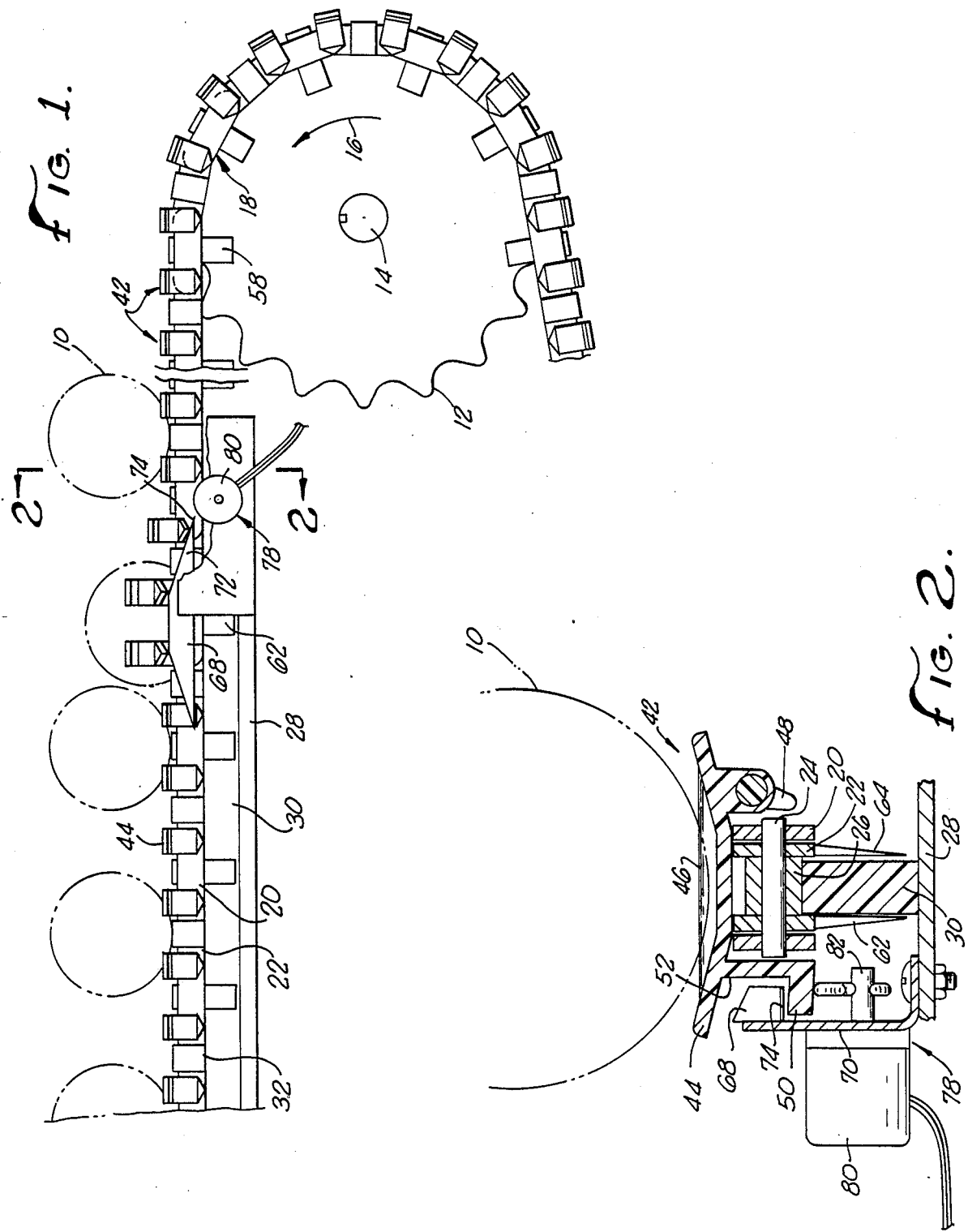

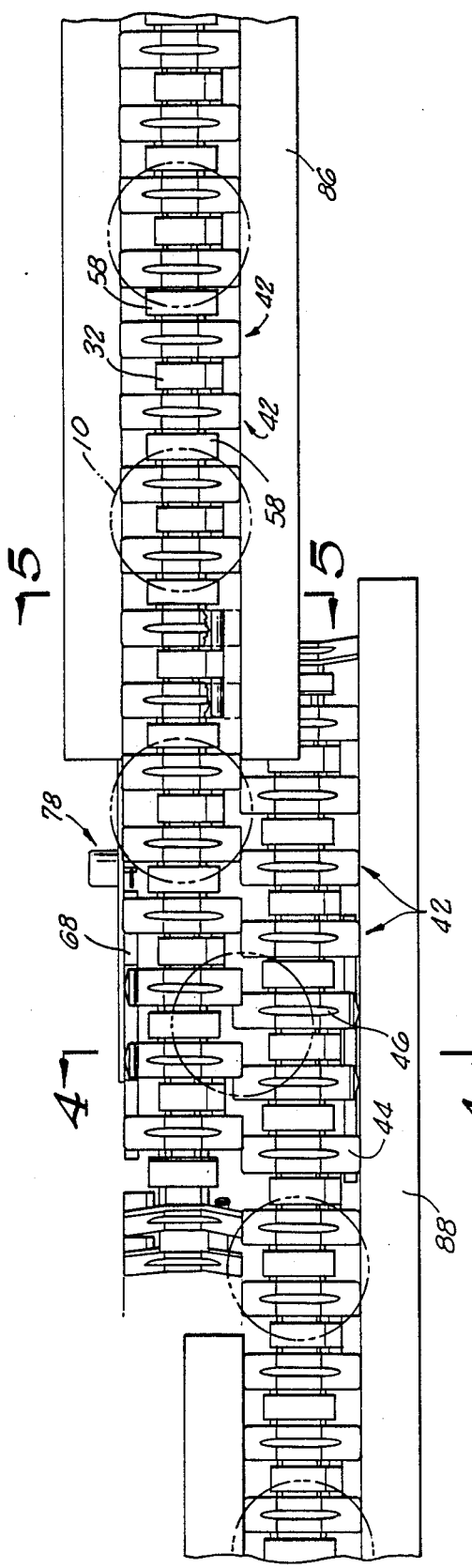
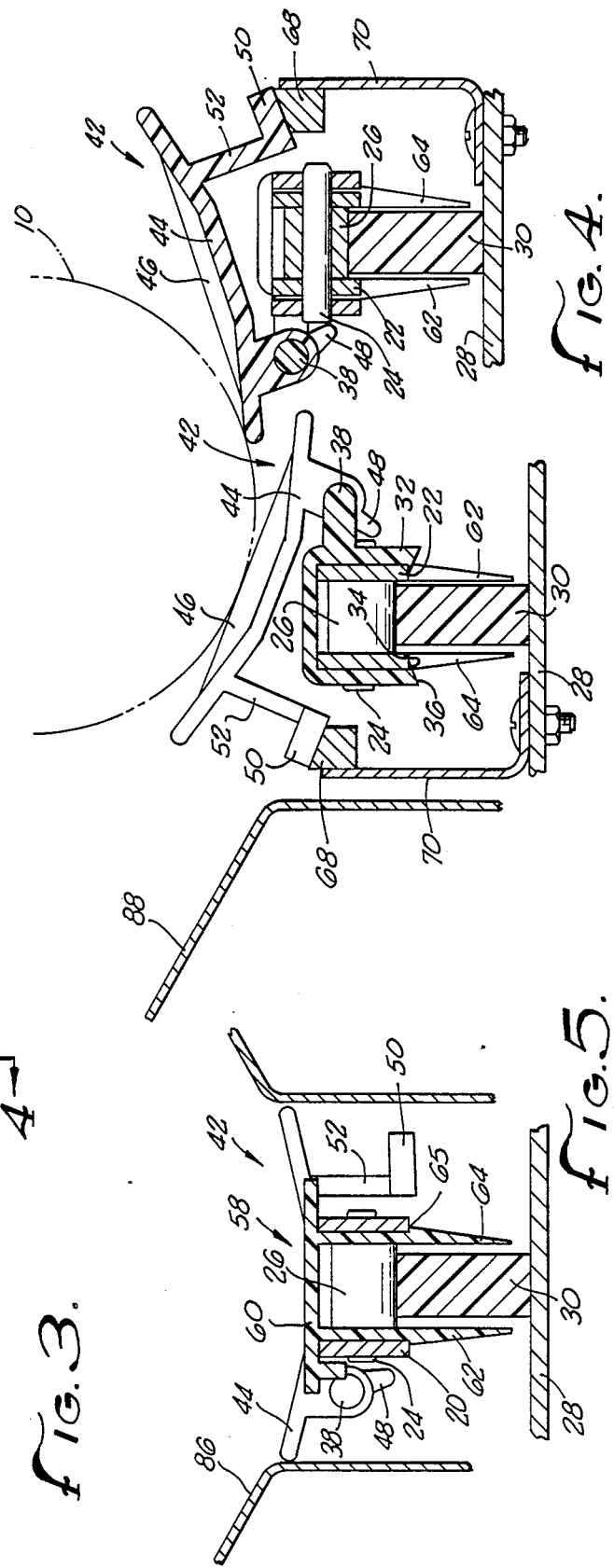

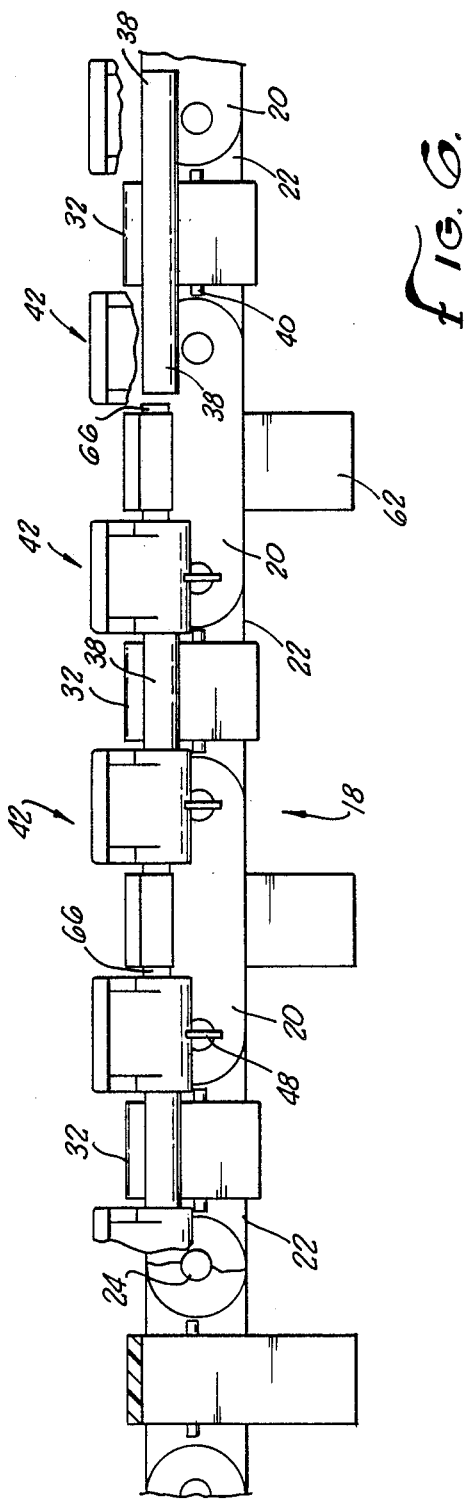
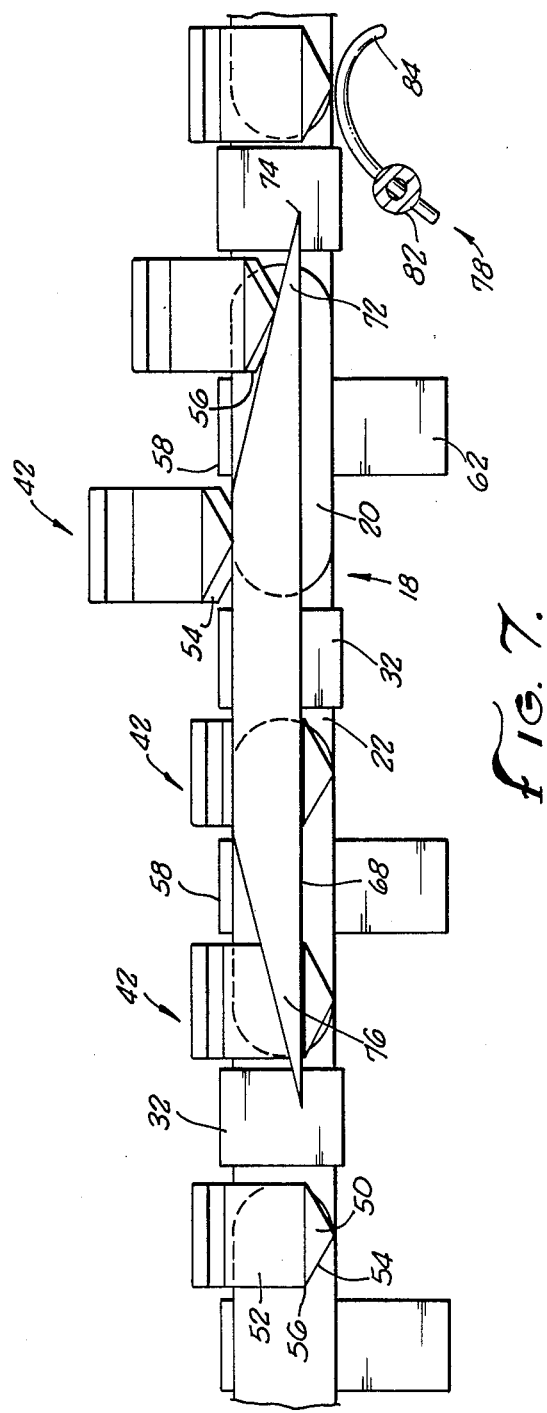

PRODUCT HANDLING SYSTEM

BACKGROUND OF THE INVENTION

The field of the present invention is systems for handling products, particularly responsive to product unit discrimination.

Product handling activities for the discrimination of product units have long been used, particularly in the food product industry. Such discrimination has been based on size, ripeness, color, blemishes and the like. Until recent times, this activity was generally undertaken by manual labor. The versatility of workers for handling and processing large amounts and varieties of food products has generally been unsurpassed. Such processing systems generally included a conveyor passing work stations where workers were able to distinguish and separate product units. Such labor was generally inexpensive and seasonal. However, difficulties in finding experienced seasonal workers and the normal administrative problems associated with a flucuating work force have long created a need for less labor intensive systems.

In defining the needs for product handling systems, as particularly applied to the food industry, the nature, volume, relative unit cost and variety of products severely inhibits the design of handling equipment. Most food products must be handled with great care to avoid damage. The perishable nature and large batch quantities of products in season makes rapid processing a necessity. The variety of products which must be processed at different times to economically justify a food processing facility places great demand for versatility on the equipment. Thus, a substantial challenge exists in creating handling equipment to replace the versatile human worker.

Recently, high speed electronics and sophisticated software have provided increasing sensing capability for detecting size and condition of individual product units and rapidly activating responsive mechanisms to proceed to handle such products. However, such systems require a more exacting placement of the product units, a separation of product units, proper orientation and reorientation of product units and means for quickly but gently separating units one from another. The demands for such exacting placement, control and operation are orders of magnitude more stringent than for manual processing. Thus, the design of handling systems has resulted in compromises in speed, efficiency and product treatment.

An earlier system for the handling of products in a manner acceptable for automatic sorting is disclosed in U.S. Pat. No. 4,106,628 to Warkentin et al for SORTER FOR FRUIT AND THE LIKE, the disclosure of which is incorporated herein by reference. In this patented device, cups are arranged on a chain conveyor for holding individual product units. Solenoids act to dump selected cups for product separation responsive to discriminating sensing and electronic commands. Other separating systems include devices for batting or blowing selected units from a conveyor.

SUMMARY OF THE INVENTION

The present invention pertains to systems and methods for handling and separating product units. A conveyor is employed which includes elements capable of tipping or otherwise moving to off-load individual units of a product being processed. The tipping or moving of individual elements on a conveyor lends the system to high speed processing of a stream of product units compatible with electronic systems control.

According to one aspect of the present invention, an elongate support may be defined by selectively movable elements to insure the proper placement of such product units acceptable for electronic sensing equipment. Additionally, the defined elongate support is capable of receiving a wide variety of sizes and shapes of products which may extend over more than one such movable element or may fit individually within shallow cavities between such elements.

Addressing another aspect of the present invention, the off-loading of individual units of the product by movement of elements on a conveyor may be specifically accomplished through the use of a plurality of tipping or rocker elements privotally mounted to the conveyor. By pivoting rocker elements about axes which are generally parallel to the conveyor, off loading is accomplished directly to the side and may be done so at a particular location or locations. The tipping action allows the off-loaded product to roll from the conveyor in a nondestructive manner. Through the use of such rocker elements, the shallow cavities which may be formed between the rocker elements are capable of retaining and handling a great variety of products varying in length, width, shape, height and sensitivity to damage. For example, according to the preferred embodiment, products from pineapples to eggs may be processed from the same conveying equipment.

A means for selectively pivoting the individual elements to effect a tipping of a portion of the elongate support may be employed with the rocker elements for the separation of individual product units in the line of units on the conveyor. The individual tipping action can give a controlled as well as selective off-loading of product units. Products may be rolled from the conveyor in a gentle manner to avoid injury. Through variation in the induced tipping action, products may be rolled or slid in a more vigorous manner to insure off-loading of the regularly shaped units. A triggering device and a camming surface or ramp may be employed to effect such selective tipping of the rocker elements. The triggering device may include a solenoid compatible with electronic systems control. The rolling of a product unit also may be used to effectively turn over the product for inspection on the opposite side thereof on a companion conveyor. Such a second conveyor may also be tipped in a like manner to ease the transfer.

The movement of elements associated with a conveyor enables individual product units to be quickly separated, gently handled, and properly located for sensing. The versatility of such a system requiring a minimum amount of actuation enables high speed processing of a wide variety of products. As a result, a single processing system may be employed to process a plurality of different products. One facility may then be capable of great utility in the food processing industry where a wide variety of shapes, sizes and other characteristics must be handled in an otherwise laborious batch process basis. Through use of the appropriate sensing mechanisms and program, such a system becomes capable of distinguishing and quickly separating product units based on a wide variety of requirements. Thus, the present invention provides a means to meet, without compromise, many of the design requirements for product handling equipment.

Accordingly, it is a principal object of the present invention to provide an improved conveying system capable of high capacity processing and separation of product units. Other and further objects and advantages will appear hereinafter.

BRIEF DESCRIPTION OF THE DRAWINGS

FIG. 1 is a side view of a selected portion of a conveyor product handling system of the present invention.

FIG. 2 is a cross-sectional end view taken along line 2—2 of FIG. 1.

FIG. 3 is a plan view of a segment of a device of the present invention illustrating two conveyors in a system.

FIG. 4 is a cross-sectional end view taken along line 4—4 of FIG. 3.

FIG. 5 is a cross-sectional end view taken along line 5—5 of FIG. 3.

FIG. 6 is a detailed elevation with portions broken away for clarity of a conveyor of the present invention.

FIG. 7 is a detailed elevation of a conveyor of the present invention illustrating a means for selectively actuating individual elements of the system.

DETAILED DESCRIPTION OF THE PREFERRED EMBODIMENTS

Turning in detail to the drawings, a preferred embodiment is illustrated in a plurality of configurations. Looking first to FIG. 1, a product handling system is illustrated as including a conveyor for conveying products 10, schematically illustrated in phantom. The conveyor includes a conventional sprocket 12 mounted about a shaft 14 for rotation in the direction of the arrow 16 as seen in FIG. 1. A roller chain 18 is positioned about the sprocket 12. Typically, a second sprocket (not shown) is aligned at a distant point to mount the other end of the conveyor. The roller chain 18 forms an elongate flexible member in the conveyor and is endless in that it forms a continuous loop.

The flexible member defined by the roller chain 18 includes links 20 and 22 which alternate along the chain and are generally hooked end to end by means of pins 24. Surrounding the pins 24 are rollers 26 which engage the sprocket 12. The links 20 are wider than the links 22 such that they can fit over the latter. The roller chain 18 is generally illustrated in this embodiment as one of a standardized group of such chains commercially available.

The conveyor is arranged such that the roller chain 18 extends along a conveying path established on the conveyor. A conveyor frame 28 includes an elongate guide member 30 positioned thereon to receive and support the roller chain 18. The cooperation between the elongate guide member 30 and the roller chain 18 is perhaps best illustrated in FIG. 2. The interaction between the roller chain 18 and the elongate guide member 30 includes the rollers 26 moving along the guide member 30 with the links 22 running along either side of the guide member 30. Naturally, the guide member 30 may be tapered at its end so as to improve the mating capability of the member with the roller chain 18.

Fixed to the roller chain 18 are a series of elements contributing to the capacity of the conveyor to appropriately handle and process product units 10 thereon. Mounting elements 32 illustrated in cross section in FIG. 4 are snap fit onto each link 22. The mounting member 32 is generally shaped as a channel in cross section with shoulders 34 formed near the ends of the legs of the channel. These shoulders act to engage the bottom of the link 22 to maintain the mounting element 32 in position. A bevel 36 extends along the ends of each leg of the channel to facilitate the forced placement of the mounting element 32 into position. In addition to the channel portion of the mounting element 32, pivot pins 38 extend on either side of the mounting element 32 generally parallel to the elongate direction of the associated link 22. The pivot pins 38 thus extending from either side of each mounting element 32 provide pivot axes parallel to the associated links 22, and thereby parallel to the local elongate direction of the chain 18. The mounting elements 32 are naturally sized to fit between the two adjacent links 20 as can best be seen in FIG. 6. Pins 40 may be included to insure a central positioning of the element 32 on the links 22.

Pivotally mounted to the flexible member 18 and particularly to the mounting elements 32 mounted on the flexible member 18 are rocker elements 42. The rocker elements 42 are pivotally mounted on the pins 38 and one rocker element 42 is mounted to each side of the mounting elements 32. Bores are provided through the rocker elements 42 for receipt of the pins 38. As the pivot pins 38 are aligned with the local elongate direction of the chain 18 and displaced laterally from the center of the conveying path, the rocker elements 42 are constrained to pivot such that they tip laterally to roll product units 10 laterally from the conveyor. The rocker elements 42 are spaced on either side of the mounting elements 32 such that two rocker elements 42 with an interposed mounting element 32 form a link set. Each link set is substantially equal to the length of the link 22 to which the mounting element 32 is affixed. This link set thus moves with the link 22 to always be parallel therewith. Because the link set is roughly equal in length to the link 22, the sets are less likely to interfere with adjacent sets and other components as will be further described.

Looking in detail to the structure of the rocker element 42, each element has a support face 44 which is concave. This concavity is relatively shallow as can best be seen in the drawings. In this way, a wide variety of products may be positioned on the support faces 44. Additionally, off-loading is facilitated by the shallow concavity, particularly with products of smaller diameter. The tipping of the rocker element 42 is advantageously arranged such that the face 44 is tipped to an extent that there is no uphill path for the product unit 10 in off-loading. This relationship is best illustrated by the right conveyor of FIG. 4 where the rocker element 42 is fully pivoted for off-loading of the product unit 10.

Located centrally in the support face 44 of each rocker element 42 is a transverse ridge 46. The ridges 46 on the rocker elements 42 are transverse in that they generally run perpendicular to the elongate direction of the conveying support. In their position on the support faces 44, the ridges extend upwardly to a position below the outer ends of the support faces 44. Thus, an elongate conveying support generally defined by the spaced support faces 44 of the rocker element 42 forms an elongate channel having transverse ridges therein. With the concavity of the support faces 44 and the ridges 46, individual cavities between ridges are defined or receipt of product units. The ridges 46 defining cavities, by not extending upwardly the full height of the support faces 44, do not completely divide the elongate conveying support channel. This allows product units which are larger than any individual cavity to be retained on the conveyor without being in an unstable position. Thus, such items as cucumbers and carrots will be retained in spite of the spanning of multiple ridges 46.

Looking further to the rocker elements 42, a stop 48 prevents excessive pivoting of these rocker elements 42. The full pivoted extent of movement of the rocker elements 42 is best illustrated in FIG. 4 where the stop 48 has come into contact with the pin 24 of the chain 18. On the side of the rocker element 42 opposite to the pivot axis is a protrusion 50 extending laterally from the conveying path. The protrusions 50 are rigidly fixed to the rocker elements 42 by means of a support member 52 extending downwardly from the support face 44. Each protrusion 50 defines a wedge or wedge surface 54 on the leading bottom side thereof to form a leading edge 56 to avoid interference with additional components of the system as will be described below. To add versatility to the components employed, the protrusions 50 are generally symmetrically shaped with a wedge surface and a leading edge in the opposite direction in order that the elements 42 may be equally applied for movement in either direction.

Between link sets, guide elements 58 are snap fitted to the links 20. The guide elements 58 are best illustrated in cross section in FIG. 5. These elements include an upper surface 60 adding to the elongate conveying support also defined by the rocker elements 42 and the mounting elements 32. Extended legs 62 and 64 extend downwardly within each link 20 and are retained therein by means of a shoulder at 65. The legs 62 and 64 along with the upper face 60 define a channel extending in the direction of the conveying path. This channel is arranged to accept the elongate conveying support 30 to better retain the flexible member 18 in position. The guide elements 58 include spacers 66 as can best be seen in FIG. 6 to properly locate the rocker elements 42 which are otherwise slidably retained on the pivot pins 38.

Means are disclosed in this preferred embodiment for the selective pivoting of individual rocker elements 42 to tip the portion of the conveying support defined by the rocker elements 42. This means includes, in the preferred embodiment, a ramp 68 which is positioned adjacent to the conveying path for selective cooperation with the protrusions 50 of the rocker elements 42. The ramp 68 is generally arranged to avoid the protrusions 50 by having a channel defined by the support face 44, the extension 52 and the protrusion 50 of the rocker element 42 pass around the ramp 68. The ramp is fixed to the conveyor support 28 by means of a bracket 70. The ramp 68 is shaped with a leading wedge section 72 extending to a leading edge 74. The leading edge 74 cooperates with the leading edge 56 of each protrusion 50 which is leading towards the ramp 68 to avoid interlocking of the elements in the direction of the conveying path. The ramp 68 may also include a wedge section 76 at the other end of the ramp 68 in case the conveyor may be driven in the opposite direction.

Positioned ahead of the ramp 68 is a selectively movable actuator 78 which includes a pivot solenoid 80 having a shaft 82 extending therefrom. The shaft 82 is pivotally actuated by the solenoid 80 upon an input signal which may be electronically controlled. A finger 84 is pivotally driven by the pivot solenoid 80 to come into interference with a protrusion 50 of individual rocker elements 42. The protrusions 50 as well as the rocker elements 42 move along the conveying path in a first path past the actuator 78 and ramp 68. The finger 84 of the actuator 78 causes the protrusion 50 to move in a second path generally perpendicular to the travel, or first path, along the conveying path of the conveyor. This results in pivotal movement of the rocker element 42 about the pivot pins 38. By appropriate timing and placement of the actuator 78, selected rocker elements 42 may be forced upwardly such that the wedge surface 54 of the protrusions 50 will engage the wedge portion 72 of the ramp 68 and be further driven upwardly by the cam surface of the ramp 68 as can best be seen in FIG. 7.

The orientation, shape and length of the ramps 68 employed can be selected to provide specific performance characteristics. The length of the ramp 68 may be generally selected to be at least equal to the span of rocker elements 42 which are supporting a given unit of product. Naturally, in the case of cucumbers, a longer ramp may be beneficially employed than for oranges. It should be remembered that the ramp for oranges can be equally long without difficulty. With products highly susceptible to injury, the wedge portion 72 of the ramp 68 may have a smaller included angle to more slowly raise the rocker elements 42. The product is thus accelerated laterally at a lower rate to accommodate its delicate nature. Where irregularly shaped products are being handled, an increased included angle of the wedge portion 72 of the ramp 68 may be used to effect a more vigorous off-loading. Naturally, the selection of the included angle must accommodate the speed of the conveyor to accomplish the appropriate off-loading motion.

In constructing the foregoing components, the several elements 32, 42 and 58 located on the chain 18 may be conveniently formed from plastic materials. The chain itself is advantageously of steel for good wear resistance. The finger 84 may be of spring steel wire while the ramp has been found to be preferably formed of a low friction, low wear material such as Micarta.

Looking to the overall construction of the conveyor, guide flanges 86 may be positioned on either side of the conveying paths to insure proper conveyance of product units. It is not intended that these flanges 86 do more than simply return the product units to the conveyor if displaced. The flanges do not themselves move with the flexible member 18.

In FIG. 3, two conveyor assemblies are illustrated side by side. The tipping action of the rocker elements 42 is illustrated in FIG. 4 to be from one conveyor to the other so that products may be rolled between assemblies. The receiving conveyor may also be tipped as can be seen in FIG. 4 to accept the product units. Additionally, the receiving conveyor may be driven faster than the first conveyor to further spread out the product. With the dual conveyor system, the product may be rolled to expose the other side thereof for inspection or treating. A similar guide flange 88 may be arranged to prevent the slowly rolling product from falling from the shallow cavities of the second conveyor.

This product handling system is intended to be compatible with an electronic sensing system 90 which senses condition of the conveyed product and monitors its location on the conveyor. When a preselected condition is sensed, such a system is capable of sending information to the actuator 78 in order that the appropriate rocker elements 42 may be tipped to off-load the product unit. Such a system may be used for excluding blemished food products from a line of acceptable food products. In the device of FIG. 3, a first sensing by first sensing means 92 is accomplished with the units 10 in a first orientation while a second sensing by second sensing means 94 is accomplished once the units have rolled from the first conveyor to the second conveyor. In this way, the majority of the product surface can be observed. In the case of simply off-loading certain products, a soft path may be provided for the off-loaded products as conventionally available. Alternately, the product may be discharged into a water-filled flume where it is conveyed to succeeding processes. In the case of the unloading of all remaining products on the conveyor, a simple cam surface on a ramp which extends fully into the path of movement of the protrusions 50 may be used to tip the entire elongate support at the off-loading station. Alternately, the products may be discharged from the end of the conveyor without tipping of the rocker elements 42.

Thus, an improved product handling system has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

I claim:

1. A product handling system, comprising
   a conveyor having a conveying path and an elongate, endless roller chain having multiple links extending along said conveying path;
   mounting elements fixed to said links, each said mounting element having a pivot pin extending parallel to the said link to which each said mounting element is fixed;
   rocker elements pivotally mounted on said pivot pins, said rocker elements including a bore for receipt of said pins and forming an elongate conveying support along said conveying path, each said mounting element and two said rocker elements each adjacent said mounting element together forming a link set, each said link set extending along said chain no more than the length of one said link;
   a guide element positioned between adjacent said link sets, each said guide element including extended legs forming a guide channel extending in the elongate direction of said roller chain, said conveyor including an elongate guide member extending along said conveying path and said guide channels being positioned on said elongated guide member when on said conveying path; and
   means for selectively pivoting individual ones of said rocker elements to tip a portion of said conveying support and holding more than one adjacent said rocker element at a time in the pivoted condition.

2. A product handling system, comprising
   a conveyor having a conveying path and an elongate, endless flexible member extending along said conveying path;
   rocker elements pivotally mounted about an axis parallel to said conveying path on said member to form an elongate conveying support along said conveying path; and
   means for selectively pivoting individual ones of said rocker elements and holding more than one adjacent said rocker element at a time in the pivoted condition to tip a portion of said conveying support, said means including a ramp positioned adjacent said conveying path and a selectively movable actuator adjacent said conveying path at one end of said ramp, said rocker elements each including a protrusion, said actuator being selectively positionable to move a said protrusion into engagement with said ramp.

3. The product handling system of claim 2 wherein each said protrusion includes a first wedge section having a first leading edge and said ramp includes a second wedge section having a second leading edge said first leading edge leading toward said second leading edge in the direction of said conveying path.

4. The product handling system of claim 2 wherein said actuator includes a pivot solenoid and a finger pivotally driven by said solenoid.

5. The product handling system of claim 2 wherein the length of said ramp is at least equal to the span of said rocker elements supporting a unit of product.

6. A product handling system, comprising
   an endless roller chain having links;
   mounting elements, each said mounting element including legs to form a channel extending to engage a said link of said roller chain and having a first support face;
   rocker elements pivotally mounted to said mounting elements and having second support faces to form together an elongate support with said first support faces of said mounting elements; and
   pivot means for pivotally mounting said rocker elements to said mounting elements, each said pivot means including a pivot pin extending parallel to the said link to which said associated mounting element is engaged, said pivot pin being fixed to one of said mounting elements and said rocker elements, and a bore for receipt of said pivot pin being fixed to the other of said mounting element and said rocker element.

7. The product handling system of claim 6 wherein said rocker elements are pivotally mounted about axes which, when on said conveying path, are parallel to and laterally displaced from the center of said conveying path.

8. The product handling system of claim 6 wherein said elongate support is concave to form an elongate channel extending along the elongate direction of said conveying support and includes ridges transverse to the elongate direction of said elongate support to form cavities on said elongate support for receipt of product.

9. A product handling system comprising
   an endless chain having links;
   mounting elements, each said mounting element being fixed to a said link and having a surface with leading and trailing edges, each of said leading and trailing edges having a pivot pin extending therefrom and parallel to the link to which each said mounting element is fixed;
   rocker elements pivotally mounted to said mounting elements and having bores for receipt of said pivot pins and support faces to form together an elongate support; and
   means for selectively pivoting individual ones of said rocker elements and holding more than one adjacent said rocker element at a time in the pivoted condition.

10. The product handling system of claim 9 wherein a said rocker element is positioned on each pivot pin of each said mounting element, each said mounting element and two adjacent said rocker elements together forming a link set, each said link set extending along said chain no more than the length of one said link.

11. A product handling system, comprising
an endless elongated chain having links;
mounting elements, each said mounting element being fixed to a said link and having sides transverse to the elongate direction of said chain, each said side having a pivot pin extending from said mounting element parallel to the said link to which can said mounting element is fixed;
rocker elements pivotally mounted to said mounting elements and having bores for receipt of said pivot pins and support faces to form together an elongate support, a said rocker element being positioned on each pivot pin of each said mounting element, each said mounting element and said two adjacent rocker elements together forming a link set, each said link set extending along said chain no more than the length of one said link; and
a guide element positioned between adjacent said link sets, each said guide element including extended legs forming a guide channel extending in the elongate direction of said endless chain diametrically across said chain from said elongate support.

12. A product handling system, comprising
an endless chain having links;
mounting elements, said mounting elements being fixed to said links and each said mounting element having a pivot pin extending from said mounting element parallel to said link to which each said mounting element is fixed;
first support faces; and
rocker elements pivotally mounted to said mounting elements, having bores for receipt of said pivot pins and second support faces, at least one said first and at least one said second support faces together forming an elongate support.

13. The product handling system of claim 12 wherein said pivot pin is laterally displaced from the center of said chain link.

14. The product handling system of claim 12 wherein each said second support face is concave to form an elongate channel extending along the elongate direction of said elongate support and includes ridges transverse to the elongate direction of said elongate support to form cavities on said elongate support for receipt of product.

15. The product handling system of claim 14 wherein said ridges extend upwardly in said channel to substantially below the top of said channel.

16. The product handling system of claim 14 wherein said ridges are substantially centered on said rocker elements.

17. The product handling system of claim 12 wherein adjacent ones of said rocker elements are spaced one from the other.

18. The product handling system of claim 12 wherein said chain is a roller chain having multiple links assembled end to end.

19. The product handling system of claim 12 wherein said mounting elements include said first support faces.

20. The product handling system of claim 12 wherein said rocker elements further have ribs extending transversely to said links and outwardly from said second support faces, each said rib being centered on said second support faces.

21. The product handling system of claim 12 wherein said mounting elements each have legs forming a channel and shoulders adjacent distal ends of said legs, said legs engaging a said link with said shoulders in interlocking engagement therewith.

22. The product handling system of claim 12 further comprising
means for selectively pivoting individual ones of said rocker elements to tip a portion of said elongate support.

23. The product handling system of claim 12 further comprising
means for selectively pivoting individual ones of said rocker elements and holding more than one adjacent said rocker elements at a time in the pivoted condition.

24. The product handling system of claim 23 wherein said rocker elements define cavities therebetween along said elongate path.

* * * * *